United States Patent
Rudin et al.

(10) Patent No.: US 7,831,533 B1
(45) Date of Patent: Nov. 9, 2010

(54) VIDEO DEMULTIPLEXING BASED ON MEANINGFUL MODES EXTRACTION

(75) Inventors: Leonid I. Rudin, San Marino, CA (US);
Jose Luis Lisani, Pasadena, CA (US);
Jean Michel Morel, Pasadena, CA (US);
Ping Yu, Pasadena, CA (US)

(73) Assignee: Cognitech, Inc., Pasadena, CA (US)

( * ) Notice: Subject to any disclaimer, the term of this patent is extended or adjusted under 35 U.S.C. 154(b) by 0 days.

(21) Appl. No.: 12/026,487

(22) Filed: Feb. 5, 2008

Related U.S. Application Data

(63) Continuation of application No. 11/028,470, filed on Dec. 31, 2004, now Pat. No. 7,328,198.

(51) Int. Cl.
*G06N 5/00* (2006.01)

(52) U.S. Cl. .......................................................... 706/45

(58) Field of Classification Search ................. 600/473; 706/45; 370/389; 704/9, 270
See application file for complete search history.

(56) References Cited

U.S. PATENT DOCUMENTS

| | | | | |
|---|---|---|---|---|
| 6,035,268 A | * | 3/2000 | Carus et al. ..................... | 704/9 |
| 6,035,274 A | * | 3/2000 | Kramer et al. ............. | 704/270 |
| 6,041,053 A | * | 3/2000 | Douceur et al. ............. | 370/389 |
| 7,366,564 B2 | * | 4/2008 | Szu et al. ..................... | 600/473 |

OTHER PUBLICATIONS

Xiong et al, Highlights Extraction From Sports Video Based on an Audio-Visual Marker Detection Framework, IEEE Int. Conf. on, Multimedia and Expo, Jul. 2005, pp. 1-4.*

* cited by examiner

*Primary Examiner*—Wilbert L Starks, Jr.
(74) *Attorney, Agent, or Firm*—Klein, O'Neill & Singh, LLP

(57) ABSTRACT

Methods and systems for grouping video frames. The video frames may be from a multiplexed stream of video frames from a plurality of video sources. In some embodiments video frames are grouped by determining if the video frames share meaningful modes for values representative of features of the video frames.

1 Claim, 6 Drawing Sheets

VIDEO DEMULTIPLEXING BASED ON MEANINGFUL MODES EXTRACTION

This application is a continuation of application Ser. No. 11/028,470 filed Dec. 31, 2004, to issue on Feb. 5, 2008, as U.S. Pat. No. 7,328,198, the disclosure of which is incorporated by reference herein.

BACKGROUND OF THE INVENTION

The present invention relates generally to video analysis, and more particularly to video demultiplexing.

A single video stream of video pictures may include video from a number of different sources. Such video streams are useful, for example, for surveillance of a number of different locations by a user at a central facility, when a user desires to view video from a number of different sources on a single monitor, or in a variety of other different uses and settings. Combining all the video sources into a single video stream allows a single user to monitor a number of locations substantially simultaneously, simplifies requirements of video systems and components of video systems, and may reduce somewhat the need for voluminous storage of video.

Unfortunately, there are instances, particularly for a later review, when only video from a single source of the many sources in the video stream is desired. Identifying, for example manually, each frame in the video stream that is from a particular video source may be burdensome.

BRIEF SUMMARY OF THE INVENTION

The invention provides systems and methods for grouping video images. In some aspects the invention provides method, using a computer, of grouping video images, comprising calculating values of a plurality of features for a plurality of video images; determining meaningful concentrations of values; and grouping video images having common values of features in the concentrations.

In some aspects the invention provides method, using a computer, of assigning video images to sub-sets, comprising receiving M video images; selecting n features characterizing at least part of video images of the M video images; determining a value of a first feature of the n features for each of the M video images; determining meaningful modes for the values; and assigning video images of the M video images having values in the same meaningful modes to the same sub-sets.

In some aspects the invention provides a method of demultiplexing a multiplexed video stream having video frames provided by a plurality of video sources, the method comprising, iteratively: receiving a video frame; computing a plurality of feature values for the video frame; comparing the plurality of feature values for the video frame with a plurality of feature values of a plurality of reference video frames; assigning the video frame to a set corresponding to a specific reference video frame of the plurality of reference video frames if differences between the plurality of feature values of the video frame and the plurality of feature values of the specific reference video frame are within a meaningful about zero; and identifying the video frame as a reference video frame if differences between the plurality of feature values of the video frame and the plurality of feature values of the plurality of reference video frames are not within a meaningful mode about zero.

These and other aspects of the invention will be more fully comprehended upon review of the following descriptions considered in conjunction with the accompanying figures.

DETAILED DESCRIPTION

Figure 1:
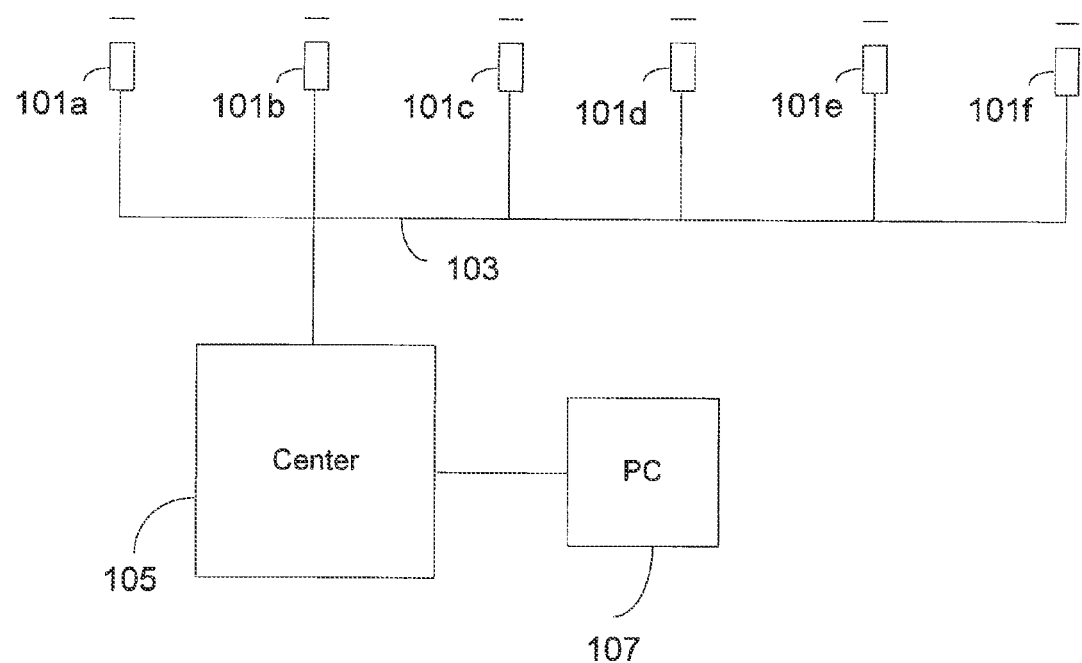
FIG. 1 illustrates a video system in accordance with aspects of the invention.

FIG. 1 illustrates a block diagram of a video system in accordance with aspects of the invention. As illustrated, the video system includes video sources 101a-f. The video sources each provide video of a different location. Only six video sources are illustrated for convenience, in different embodiments varying numbers of video sources are utilized.

The video sources, for example, may be analog or digital cameras providing video frames. Each video frame may be, for example, 512×512 pixels, 480×612 pixels, or various other video formats, which include PAL, SECAM, NTSC, etc. For non-digital sources a digitizer may be used to digitize the images. In some embodiments the digitizer is located at the video source itself, in other embodiments a digitizer is located at some other location in the system. In many embodiments, however, video is maintained in analog format.

Video streams from the video sources are provided to a center 105. The video streams may be provided over a common bus 103, or provided via separate lines multiplexed approximate the center. In some embodiments the bus in a local area network (LAN), and in some embodiments the bus is part of a global computer network such as the Internet. In any event, the center, or a location within the center, receives a multiplexed video stream. The multiplexed video stream includes video from multiple video sources.

The center may include video terminals for viewing the multiplexed video stream, such as may be utilized by security personnel for a facility or a number of facilities. A center may, in some embodiments, include storage for storing received multiplexed video. The center may also be linked to a personal computer (PC) such that the PC may access the multiplexed video. In some embodiments the center is simply a PC. Alternatively, memory storing the multiplexed video may be otherwise made available to the PC, or some other computer unit. This may be accomplished by way of a network method, or by physical transport of physical storage. In many embodiments the PC, or other computer unit, is remote from the center, and video is maintained at the center in analog form. In such embodiments video information may be stored in analog format, for example on a VHS type tape. The tape may therefore be transported to the PC, which includes a digitizer.

Figure 2:
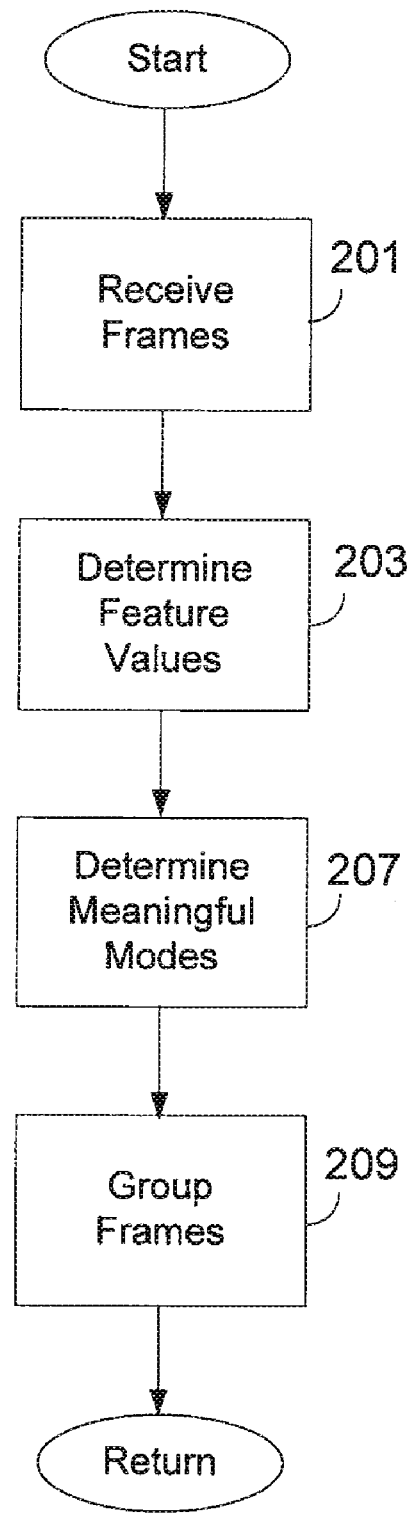
FIG. 2 is a flow diagram of a process for demultiplexing video in accordance with aspects of the invention.

In some embodiments the PC, or other computer unit, performs a process to classify video frames. A flow diagram of a process for classifying, or grouping, video frames is provided in FIG. 2. The process is used, in some embodiments, for demultiplexing video frames. As shown in FIG. 2, in block 201 the process receives a video frame. In block 203 the process determines a value associated with a feature of the video frame.

Each video frame is characterized by a number of features. For example, for a video frame with pixels indicated by a four level gray scale, a gray scale value for a particular pixel, such as the pixel in the uppermost left corner of the video frame, is a feature of the video frame. In such a case the value of the feature would be, for example, the gray scale value of the uppermost left pixel.

In embodiments of the invention values associated with features of video frames are used to identify specific sources of the video frames. For such purposes a gray scale value of a single pixel may not provide sufficient distinction between video sources. There simply may not be sufficient variation in a single pixel to identify a specific video source, or the distinction may not be statistically significant.

In various embodiments, accordingly, the feature is the average gray level of the image, the average color of the image, for example, computed as the average value of the key component of the pixels, for example, in the hue component when color information is represented in the HIS color space, or a number of other components based on the information representing the image. For example, a feature may be the number of pixels above a specified gray scale level.

Features which relate to the entirety of a video image may be considered global features. Features, however, may relate to localized portions of the video image. For example, the gray value of the uppermost left pixel is a local feature as it pertains to only a localized area of the video image. Similarly, a local feature may be the average gray level of portions around the outermost edges of a video frame, the average color, or other features.

Somewhat more completely, each frame may be characterized as having a set of n features $(f_1, f_2, \ldots, f_n)$. A definition of a feature may be heuristically chosen, with the feature based on aspects of the video frame. In other words, if a video frame is characterized by pixels $c_{11} \ldots c_{mn}$, then a feature $f_i$ may be selected such that defines a global feature or $f_i (c_{ij} \ldots c_{kl})$, either or both of ij>11 or kl<mn being true, defines a local feature.

Thus, in block 203 the feature value is determined for the received video frame.

In block 207 the process determines meaningful modes for the received frames. A meaningful mode is a concentration of data over an interval, the mathematical expectation of which is very small. The expectation may be determined, in various embodiments, using a uniform distribution, a Gaussian distribution, a binomial distribution, or through use of other statistical analysis or stochastic processes.

In block 209 the process groups together frames that exhibit feature values that have the same meaningful modes.

In further embodiments the process of FIG. 2 is repeated for multiple features. Repeating the process for multiple features allows for further distinction between groups of video frames, as well as allowing for further processing to determine whether a particular video frame should or should not be grouped with other sources.

Figure 3:
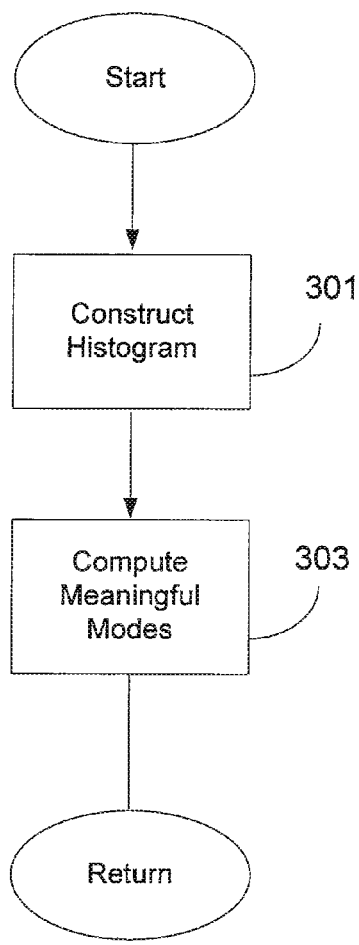
FIG. 3 is a flow diagram of a process for determining modes in accordance with aspects of the invention.

FIG. 3 illustrates a flow diagram of a process for determining meaningful modes. In block 301 a histogram is constructed. The histogram is of the set of scalar data values, determined for example, by the feature values, such as computed in the process of FIG. 2. The histogram is a function that assigns, to each value, its number of occurrences in the dataset. Thus, if the feature value has eight possible values, 0 . . . 7, and 1,000 video frames are processed, it may be found that the value zero may occur a times, the value 1 occur b times, . . . the value 7 occur h times, with a+b+ . . . +h=1,000.

In block 303 the process computes meaningful modes. A mode in a histogram is an interval of values where data is concentrated. A mode is said to be meaningful if the expectation of such a concentration is very small. Additional information regarding meaningfulness and meaningful modes may be found, for example, in Desolneux et al., Maximal Meaningful Events and Applications to Image Analysis, The Annuls of Statistics, Vol. 31, No. 6, p. 1822-1851, December 2003, incorporated by reference herein. The process thereafter returns.

Figure 4:
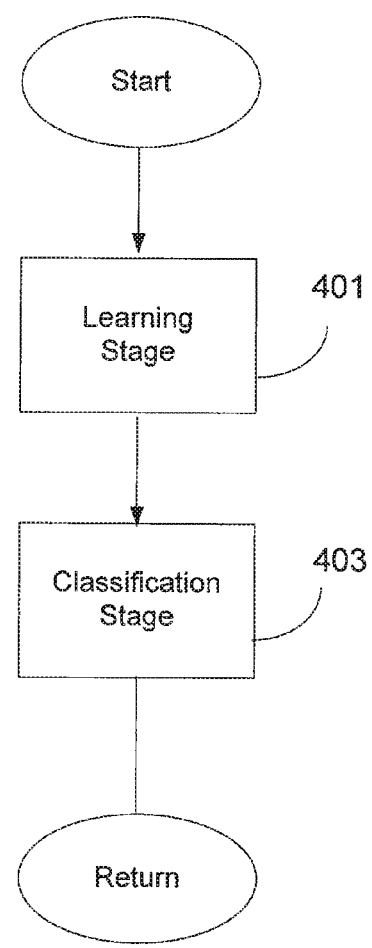
FIG. 4 is a flow diagram is a process for classifying video frames in accordance with aspects of the invention.

FIG. 4 illustrates a flow diagram of a process for classifying video frames, or for demultiplexing a multiplexed video stream. In block 401 of the process of FIG. 4 a learning stage occurs. In the learning stage a number of video frames are examined, and values for features of the video frames are determined. Based on the feature values characteristic features indicating video frames from common sources are identified.

In block 403 video frames are examined and feature values for the video frames are calculated. The feature values are compared with the characteristic feature values of video groupings derived from the learning stage. Based on the comparison with the characteristic features derived from the learning stage video frames are classified, or assigned to groups, or demultiplexed, into common groupings. The process thereafter returns.

Figure 5:
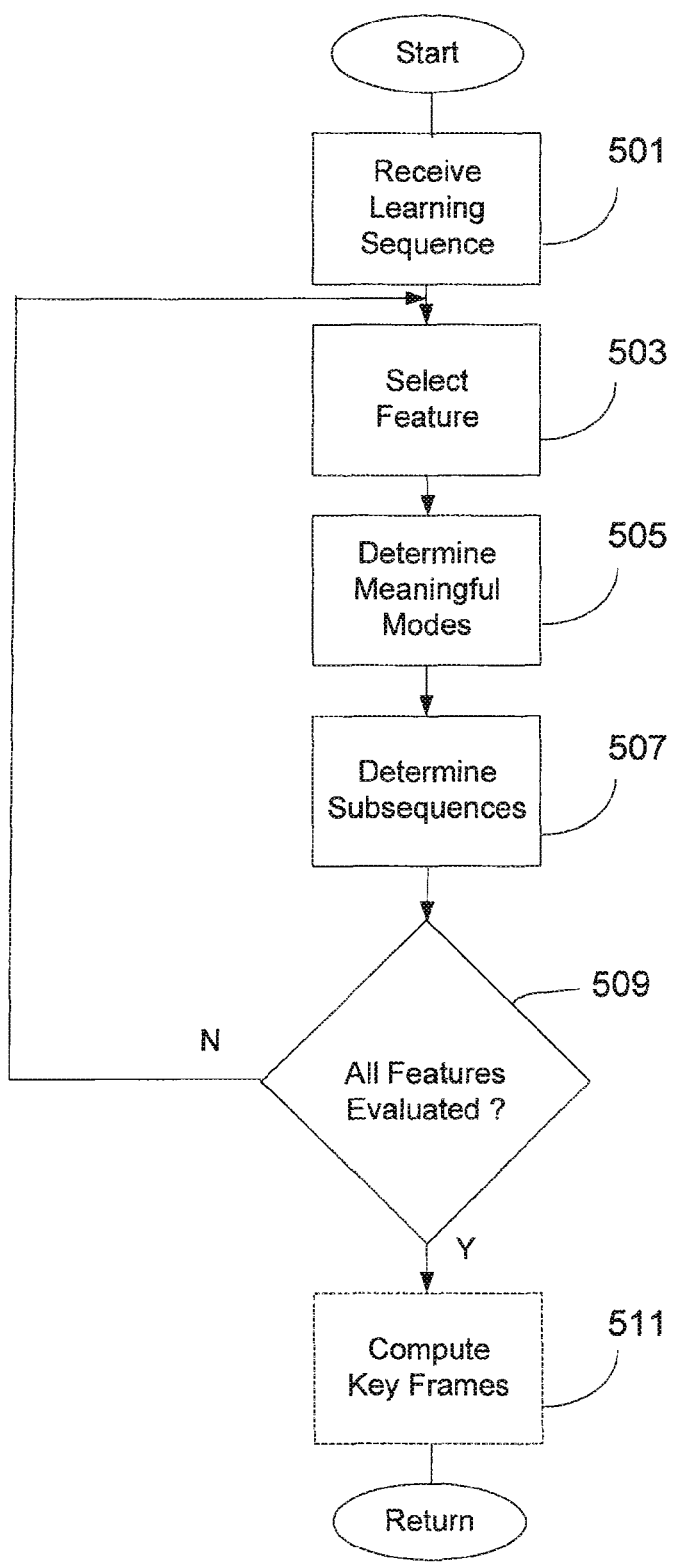
FIG. 5 is a flow diagram of a process for performing a learning stage in accordance with aspects of the invention.

FIG. 5 is an embodiment of a process for performing a learning stage. In block 501 a sequence of frames is received. The sequence of frames may be considered a learning sequence as the sequence of frames are frames used to determine characteristic modes of video frame groupings. The learning sequence may be considered a group of M frames.

In block 503 a feature is selected. For example, each frame may be viewed as being characterized by a set of n features $(f_1, f_2, \ldots, f_n)$. In block 503 one of the n features is selected.

In block 505 meaningful modes for the feature, if any, are determined. Meaningful modes may be determined by computing values for the selected feature, constructing a histogram of occurrences of values for the selected feature, and determining if the histogram exhibits meaningful modes.

In block 507 subsequences of the learning sequence are determined. Subsequences include frames that have feature values in the same meaningful modes.

In block 509 the process determines if all features have been evaluated. If all features have not been evaluated the process returns to block 503. In block 503 a further feature is selected. If the features are identified for example by features $f_1 \ldots f_k$, then additional features may be selected merely by incrementing a feature value counter. The process then continues to determine meaningful modes for the further feature, as in block 505, and determining subsequences of frames corresponding to meaningful modes for the further feature in block 507. Preferably the subsequence is separately evaluated with respect to each further feature, allowing further division of subsequences as identified by the further features. In other embodiments, however, subsequences are separately identified for each feature, and the various subsequences are then later evaluated to determine subsequences.

In some embodiments the process repeats the operations of blocks 503-509 with differing feature orders. For example, determination of subsequences may be dependent on the order in which features are evaluated, in some instances. Accordingly, if the determination of subsequences is not considered acceptable or if confirmation of the determination of subsequences is desired, for example, the operations of blocks 503-509 may be repeated with a different ordering of features.

Once all features have been evaluated, optionally a key frame may be computed in block 511. The key frame summarizes information, or modes, common to frames of the same subsequence. The process thereafter returns.

In some embodiments, a set of n features with feature values $(f_1, f_2, \ldots, f_n)$ are selected for use in classification. Each of the n features has an associated value defined by $f_i$ $(c_{gh} \ldots c_{ij})$. A set of M frames in a video stream are selected as a learning sequence. A feature index, denoted by index, is initialized to 1, and values $f_{index}$ are computed for the M index frames. A histogram for the values of $f_{index}$ is constructed, and meaningful modes in the histogram are identified. For each meaningful mode a subsequence of frames is determined, with the subsequence comprising the frames that contribute to the mode.

For each subsequence the feature index is incremented and values for $f_{index}$ for the frames of each subsequence are computed. Histograms for the values of $f_{index}$ are again constructed, and meaningful modes are identified. Further subsequences, comprised of frames of the previously derived subsequence, are determined, with the frames of the further subsequence contributing to the mode.

The iterative process of defining further subsequences, incrementing $f_{index}$, calculating further feature values, and identifying further meaningful modes for each subsequence is continued until n features have been evaluated. The meaningful modes to which each final subsequence contributes are identified for each final subsequence, and these meaningful modes define a group of frames in a video sequence. Optionally, a key frame having information corresponding to the meaningful modes may be constructed.

Further frames are then examined. For the further frames feature values for the n features are determined, and the values are compared to the meaningful modes of each ultimate subsequence. Based on the comparison each further frame is assigned to the group of frames identified by the modes of the subsequence.

Figure 6:
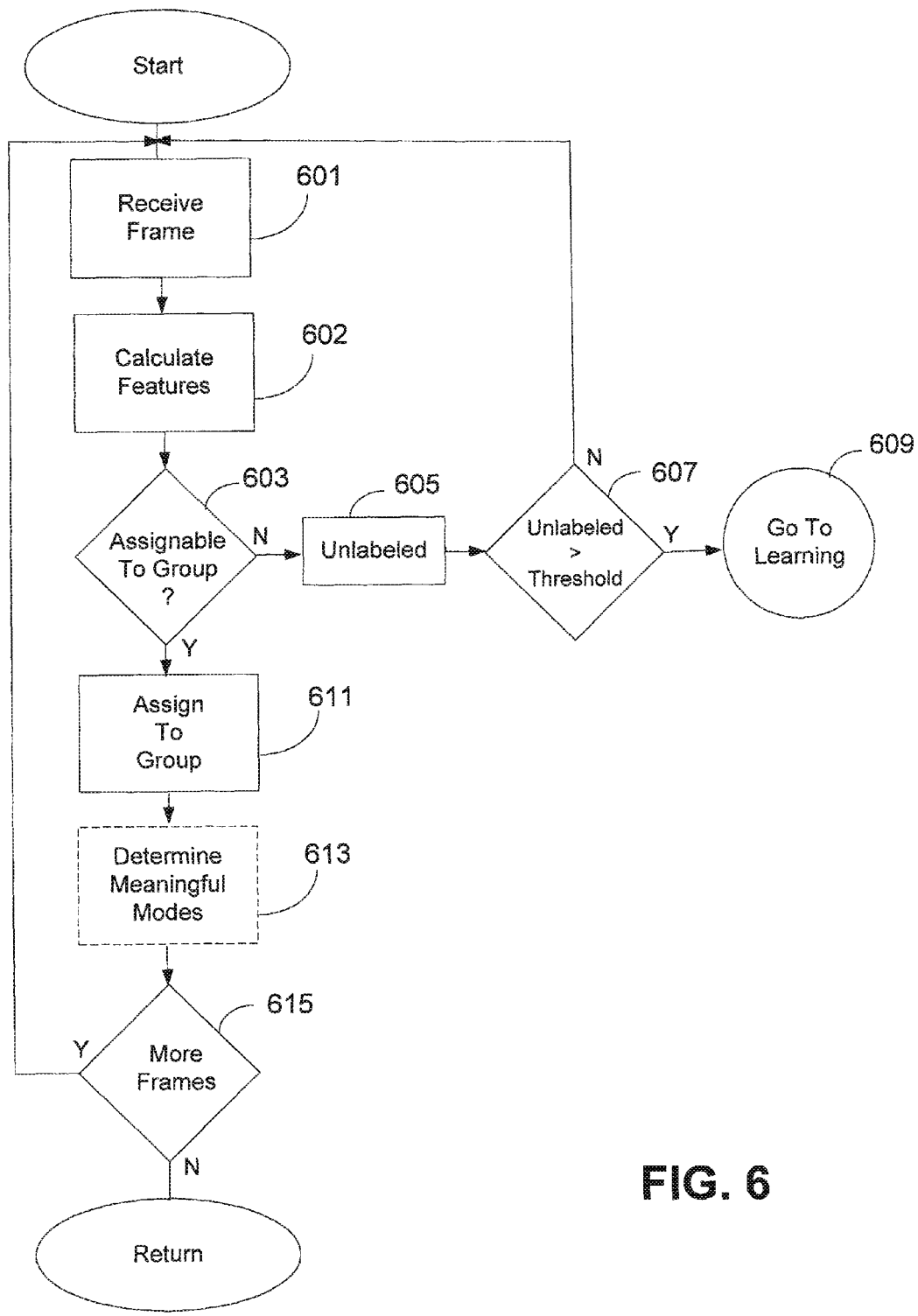
FIG. 6 is a flow diagram of a classification process in accordance with aspects of the invention.

FIG. 6 is a flow diagram of a process for assigning frames to groups. If the frames are derived from a video stream, the process may be viewed as a video demultiplexer. In block 601 the process receives a video frame. In block 602 the process calculates feature values for predetermined features characterizing the video frame. Preferably, the selected features are the features used in a learning process, such as learning process of FIG. 5. In block 603 the process determines if the video frame is assignable to a group of subsequence of video frames. In some embodiments this determination is made by determining the modes associated with feature values of the video frame and comparison of the modes to the modes of the subsequences determined, for example in the learning sequence of FIG. 5. If the video frame is not assignable to a group the video frame is marked as unlabeled in block 605. In block 607 the process determines if the number of unlabeled frames is greater than a preidentified threshold. If the number of frames that are unlabeled is above the predetermined threshold then the process goes to a learning sequence, such as the learning sequence of FIG. 5. If the process, in block 607, determines that the number of unlabeled frames is less than the threshold the process returns to block 601 and processes a further frame.

If the process in block 603 determines that the frame is assignable to a group then in block 611 the process assigns the video frame to a group.

Optionally, in block 613, the process updates the values defining a mode or key frame for the assigned group.

In block 615 the process determines if more frames remain for classification. If so, the process returns to block 601 and processes a further frame. If not, the process returns.

Figure 7:
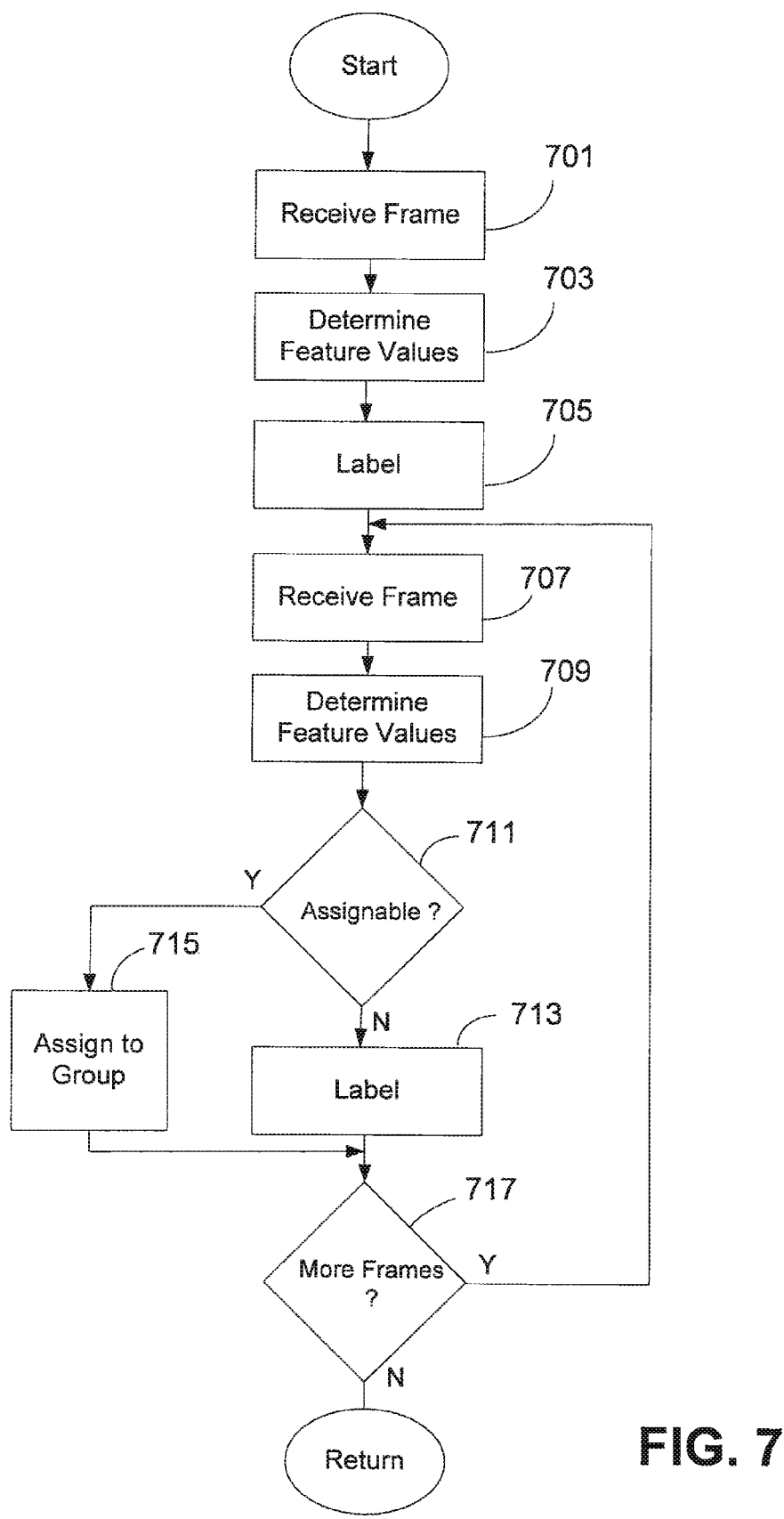
FIG. 7 is a flow diagram of a process for performing video frame classification in accordance with aspects of the invention.

FIG. 7 is a flow diagram of a further process for classifying video frames from a stream of video frames. In the process of FIG. 7, video frames are evaluated by features and either assigned to previously classified video frames with common features, or labeled as defining a new group of video frames.

In block 701 a video frame is received. In block 703 values for features characterizing the video frame are determined. In block 705 the video frame is labeled as defining a group of video frames.

Block 701, 703, and 705 of the process may be viewed as a init procedure for the process, with the init procedure processing an initial video frame at the beginning of the process. Alternatively, the init procedure may be subsumed in the general processing of the process.

In block 707 the process receives a further video frame. In block 709 the process determines values for features of the video frame.

In block 711 the process determines if the video frame is assignable to previously identified groups of video frames. Assignment is based on the value of the features for the video frame. In some embodiments, the values for features are compared with modes, and preferably meaningful modes, of previously identified groups of video frames.

If the video frame is not assignable to a previously existing group of video frames, then the video frame is labeled as identifying a new group in block 713. If the video frame is assignable to a group, then in block 715 the video frame is assigned to the appropriate group. In block 717 the process determines if there are more frames to process. If so, the process returns to block 707. Otherwise the process returns.

In some embodiments, a set of n features with feature values $(f_1, f_2, \ldots f_n)$ are selected for use in classification. A first frame in a video stream is identified as a reference frame and labeled as belonging to a first group. Feature values $f_i$ are calculated for the first frame, and the feature values may be considered reference feature values for the first group $(f_1^{R1}, f_2^{R1}, \ldots f_n^{R1})$.

For each subsequent frame in the video stream, feature values $(f_1, f_2, \ldots, f_n)$ are determined. The feature values are compared with the feature values of each reference frame. In some embodiments, a comparison is performed by determining the difference between feature values of the frame and feature values of the reference frames. For example, for the first reference group the differences $(|f_1-f_1^{R1}|, |f_2-f_2^{R1}|, \ldots, |f_n-f_n^{R1}|)$ are calculated. If the differences, in whole or in part in various embodiments, indicate a meaningful mode, preferably a meaningful mode around zero, the frame is assigned to the first reference group.

In some embodiments the frame is considered to belong to a reference group i if all of the values $|f_j-f_j^{Ri}|$ indicate a meaningful mode around zero. Such a determination is believed more useful if all of the features are global features, namely applying to the entirety of a video image.

In some embodiments the frame is considered to belong to a reference group i if a number of the values $|f_j-f_j^{Ri}|$, preferably a meaningful number of values, indicate a meaningful mode around zero. Such a determination is believed more useful if all of the features are local features, namely applying to less than the entirety of a video image.

If the frame is not assigned to a previously identified group, then the frame is considered a further reference frame identifying a further group.

In various embodiments processing is also performed to account for jitter in a video source. A video source may provide an image that changes over time, for example due to vibration or other movement of a video capture device. Vibration or movement of the video capture device, or inconsistencies in processing of video by the video capture device or elsewhere, may result in video images from the same shifting, for example vertically and/or horizontally.

Accordingly, in some embodiments feature values are determined for images with pixels or sub-pixels shifted by +−1, +−2, ..., +−x in various directions. The feature values are therefore for shifted versions of images. The feature values for the shifted versions of images are also examined with respect to meaningful modes for assigning to subsequences or otherwise classifying images. The examination occurs in various embodiments as previously described.

Further, calculation of feature values for shifted versions of images is useful, in some embodiments, for detecting motion, such as panning, of a video source, such as a video capture device. For example, motion of a video source may be detected if a sequence of video images in a subsequence exhibit a shift in a particular direction.

Motion of a video source may be detected using meaningful modes in other ways as well. In some embodiments appropriate selection of a feature, or a number of features, may detect video images from a single source even if the single source moves, whether by panning, rotating, zooming, or otherwise. Preferably, motion of a video source is determined through selection of features invariant under physical motion of the video source. For example, in some circumstances an average gray level or an average color level, both of which may be general features, may be invariant in a meaningful mode ways even when a video source exhibits movement. As another example, in some embodiments a selected feature is a number of pixels with a brightness above a set level, or another local feature. The local feature may occur in an invariant fashion in video images from a single source, even under motion of the single source.

In some embodiments it is useful to determine a key frame. A key frame is a video frame having characteristics similar to frames in a group of frames. The key frame is used, in some embodiments, for comparison with video frames. For example, an incoming video frame may be compared to the key frame.

Key frames may be determined, for example, by computing an average frame, or an expected average frame, of a group of frames. The average frame may include a variance check. A key frame may also be computed by determining meaningful modes of pixels in a group of frames.

An average frame may be computed, for example, using an average gray level. In some embodiments, an average gray level of each pixel $c_{ij}$ in each frame in a group of frames is calculated, and a key frame is formed using pixels having the average gray level of the corresponding pixels. For color images average values of color components may be used instead of gray levels.

The average frame may also include variance checks. During computation of the average gray level a variance is also calculated. If the variance exceeds a threshold, then the gray level for each pixel is recalculated without consideration of pixels (from the frames in the group) whose gray level is outside the threshold.

In some embodiments the key frame is determined by computing meaningful modes for each pixel. For example, a histogram for each pixel is constructed. The histogram, for example, may be of the gray level value of each pixel, or a value of some other feature. Meaningful modes for the gray level, or other feature value, are determined, and a value within the interval of values identified as meaningful modes is selected for use in the key frame. In some embodiments the midpoint of values of the meaningful modes is selected, and in other embodiments a maximum value of the meaningful modes is selected.

Although this invention has been described in certain specific embodiments, many additional modifications and variations would be apparent to one skilled in the art. It is therefore to be understood that this invention may be practiced otherwise than is specifically described. Thus, the present embodiments of the invention should be considered in all respects as illustrative and not restrictive, with the scope of the invention to be indicated by the appended claims, their equivalents, and claims supported by the specification.

What is claimed is:

1. A method, using a computer, of grouping video frames from a plurality of cameras, comprising:

calculating first values for a feature for a first sequence of video images;

determining meaningful concentrations of the first values;

calculating second values for a second feature for the first subsequence of video frames, the first subsequence of video frames being a subset of the first sequence of video frames, with similar meaningful concentrations of the first values;

determining meaningful concentrations of the second values;

calculating third values for a third feature for a second subsequence of video frames, the second subsequence of video frames being a subset of the first subsequence of video frames with similar concentrations of the second values;

determining meaningful concentrations of the third values;

calculating further values for each of the first feature, the second feature, and the third feature for a second sequence of video frames; and assigning first video frames of the second sequence of video frames to a first group if the first video frames have similar meaningful concentrations of the first values, the second values, and the third values, the first video frames being a subset of the second subsequence of video frames, assigning second video frames of the second sequence of video frames to a second group if the second video frames have similar meaningful concentrations of first values and second values but not third values, and assigning third video frames of the second sequence of video frames to a third group if the third video frames have similar meaningful concentrations of first values but not second values or third values.

* * * * *